United States Patent [19]
Holtermann

[11] Patent Number: 5,425,232
[45] Date of Patent: Jun. 20, 1995

[54] MARINE PROPULSION DEVICE WITH MEANS FOR SUPPLYING SECONDARY AIR TO CATALYTIC CONVERTER

[75] Inventor: Theodore J. Holtermann, Brookfield, Wis.

[73] Assignee: Outboard Marine Corporation, Waukegan, Ill.

[21] Appl. No.: 128,475

[22] Filed: Sep. 28, 1993

[51] Int. Cl.⁶ ............................................. F01N 3/20
[52] U.S. Cl. ..................................... 60/272; 60/302; 60/307; 440/89
[58] Field of Search ..................... 60/272, 302, 307; 440/89

[56] References Cited

U.S. PATENT DOCUMENTS

| | | | |
|---|---|---|---|
| 2,119,402 | 5/1938 | Puffer | 123/559.1 |
| 2,956,865 | 10/1960 | Williams, Sr. | 23/284 |
| 3,058,299 | 10/1962 | Dean | 50/30 |
| 3,059,419 | 10/1962 | Schnabel | 60/30 |
| 3,082,597 | 3/1963 | Hamblin | 60/30 |
| 3,091,078 | 5/1963 | Dworak | 60/30 |
| 3,116,596 | 1/1964 | Boehme et al. | 60/30 |
| 3,396,535 | 8/1968 | Milos | 60/30 |
| 3,672,172 | 6/1972 | Hammond | 60/282 |
| 3,771,921 | 11/1973 | Rohde et al. | 417/12 |
| 3,852,959 | 12/1974 | Weisgerber | 60/290 |
| 3,862,540 | 1/1975 | Harvey | 60/290 |
| 3,948,236 | 4/1976 | Nartowski | 60/307 |
| 4,098,078 | 7/1978 | Laurent | 60/274 |
| 4,276,745 | 7/1981 | Takada et al. | 60/276 |
| 4,735,046 | 4/1988 | Iwai | 60/302 |
| 4,772,236 | 9/1988 | Takahashi | 60/302 |
| 5,167,934 | 12/1992 | Wolf et al. | 422/177 |

Primary Examiner—Ira S. Lazarus
Assistant Examiner—Daniel J. O'Connor
Attorney, Agent, or Firm—Michael, Best & Friedrich

[57] ABSTRACT

Disclosed herein is a marine propulsion device comprising a combustion chamber, an exhaust passage, an air pump and a three-way catalytic converter. The air pump pumps air into the exhaust passage at or immediately upstream of the catalytic converter. By this construction the internal combustion engine can be run slightly rich, but the catalytic converter will see a close to stoichiometric mixture so that the pollutants in the exhaust stream can be oxidized or reduced appropriately since the catalytic converter will be able to operate as a three-way catalytic converter.

12 Claims, 2 Drawing Sheets

MARINE PROPULSION DEVICE WITH MEANS FOR SUPPLYING SECONDARY AIR TO CATALYTIC CONVERTER

BACKGROUND OF THE INVENTION

The invention relates to arrangements for discharging exhaust gases so as to decrease the amount of pollutants therein. More particularly, the invention also relates to pollution lessening arrangements which include provision for providing additional air to more fully oxidize and reduce pollutants in the engine exhaust gases.

It has been known in the automotive art to provide an air pump to be driven off the drive shaft of an internal combustion engine to supply air into the exhaust stream upstream of a catalytic converter. These catalytic converters were found in early automotive attempts to install catalysts and comprised oxidizing catalysts that would burn or oxidize the fuel not oxidized in the combustion chamber. These engines did not have to be concerned about reducing NOx due to the regulations at the time. Accordingly, a relatively large air pump was included and additional air was pumped into the exhaust system upstream of an oxidizing catalyst. Little or no attempt was made to provide a stoichiometric environment, immediately in front of or in the catalyst.

At the present time, exhaust emissions regulations require engine designers to be concerned about three major pollutants, unburned hydrocarbons (HC), carbon monoxide (CO) and oxides of nitrogen (NOx). The amount of HC and CO can be decreased by oxidizing these constituents in a catalytic (or thermal) reactor to form water and carbon dioxide. With a catalyst, the NOx can also be decomposed to form oxygen and nitrogen, but this reaction normally requires a reducing atmosphere, an absence of oxygen, to take place. With a proper catalyst and control of gases entering the catalyst, it is possible to produce a three-way catalyst; one which will oxidize the CO and HC and simultaneously reduce the NOx. However, to optimize these reactions it is necessary to hold the air-fuel ratio of the reactive constituents within a narrow range around a stoichiometric air-fuel ratio as shown in FIG. 2.

The three-way catalyst is currently a fairly common technique for reducing the emissions of automobile engines. Typically, stoichiometry is assured by using an oxygen sensor to determine the state of the exhaust mixture after discharge from the engine and before the catalyst. The signal from the sensor is fed back to an electronic controller which then regulates the amount of fuel delivered to the charge forming means, typically a fuel injection system, to create a stoichiometric air/fuel ratio in the charge forming means upstream of the combustion chambers. No extra air is added at or before the catalyst. From the standpoint of the engine, the stoichiometric air/fuel mix produces very good fuel efficiency and low overall emissions, but is not necessarily optimum for power or running quality and, because of high internal temperatures, it can adversely effect engine life, especially exhaust valve life when running at high engine loads.

Attention is directed to the following U.S. patents:

| | | |
|---|---|---|
| 2,956,865 | D. P. Williams | October 18, 1960 |
| 3,058,299 | W. M. Dean | October 16, 1962 |
| 3,059,419 | J. W. Schnabel | October 23, 1962 |
| 3,082,597 | R. J. J. Hamblin | March 26, 1963 |
| 3,091,078 | T. A. Dworak | May 28, 1963 |
| 3,116,596 | Boehme, et al. | January 7, 1964 |
| 3,396,535 | L. W. Milos | August 13, 1968 |
| 3,672,172 | G. L. Hammond | June 27, 1972 |
| 3,771,921 | Rohde, et al. | November 13, 1973 |
| 3,852,959 | T. W. Weisgerber | December 10, 1974 |
| 3,862,540 | B. J. Harvey | January 28, 1975 |
| 4,098,078 | P. A. Laurent | July 4, 1978 |
| 4,276,745 | Takada, et al. | July 7, 1981 |
| 5,167,934 | Wolf, et al. | December 1, 1992 |

U.S. Pat. No. 5,167,934 discloses a marine propulsion system with a catalyst having a reducing part, and an oxidizing part located axially downstream of the reducing part, with secondary air of undefined quantity introduced to the oxidizing part only.

Attention is also directed to a paper entitled "An Historical Overview of Emission-Control Techniques for Spark-Ignition Engines: Part B—Using Catalytic Converters" written by J. R. Mondt of General Motors Corporation which is undated.

SUMMARY OF THE INVENTION

The invention provides a marine propulsion device comprising an engine including a cylinder having an exhaust port, an exhaust passageway communicating with the exhaust port, a 3-way catalytic converter located in the exhaust passageway, and an air pump which is driven by the engine at all times when the engine is operating, which communicates with the atmosphere and with the catalytic converter and which operates to supply air to the exhaust passageway at or immediately upstream of the catalytic converter.

The invention also provides a marine propulsion device comprising an engine including a combustion chamber having an exhaust port, an exhaust passage communicating with the exhaust port, a charge forming device, the charge forming device providing the cylinder with an air/fuel mixture that is richer than stoichiometric, a catalytic converter located in the exhaust passage and an air pump communicating between the atmosphere and the exhaust passage, said air pump being sized and operated to provide air to the exhaust passage immediately upstream of the catalytic converter so that the catalytic converter receives an air/fuel mixture that is at or about stoichiometry.

The invention also provides a method of operating a marine propulsion device having a four cycle spark ignited internal combustion engine including a charge forming means for creating an air/fuel charge, a combustion chamber, an exhaust passage, an air pump which communicates with the atmosphere and the exhaust passage, and a three-way catalytic converter, the method comprising creating an air/fuel charge that is richer than a stoichiometric mixture in the charge forming means, combusting the charge in the combustion chamber, discharging the combusted charge into the exhaust passage, adding to the combusted charge the amount of air that would have been needed to create a substantially stoichiometric charge in the charge forming means by pumping a preselected amount of air from the air pump into the exhaust passage, and passing the combusted charge and the added air through the three-way catalyst.

In one embodiment, the amount of air added to the combusted charge is equal to the amount of air pumped by the air pump.

In one embodiment, the engine operates over a range of speeds and the amount of air pumped by the air pump is greater than the amount of air added to the combusted charge during a portion of the range of speeds.

In one embodiment, the engine also has an air line between the air pump and the exhaust passage and the air line has a metering orifice and a pressure relief valve, and the method further comprises the step of blowing off a portion of the pumped air into the atmosphere when the pressure in the air line exceeds a predetermined pressure.

In one embodiment, the engine includes a crankshaft and the air pump is driven off the crankshaft. In one embodiment, the air pump is coupled to the crankshaft by means of pulleys and a belt, and the pulleys and air pump are sized so that output of the pump meets the needs Of the engine so that the amount of air pumped by the air pump and added to the combusted charge is equal to the amount needed to have created a stoichiometric charge in the charge forming means.

In one embodiment, the engine also has an air line between the air pump and the exhaust passage and the air line has a controllable diverter valve, and the method further comprises the steps of determining the amount of air needed to be added to the combusted charge and controlling the diverter valve to divert excess pumped air to the atmosphere.

The invention also provides a method of operating a marine propulsion device having a four cycle spark ignited internal combustion engine including a charge forming means for creating a fuel/air charge, a combustion chamber, an exhaust passage, an air pump which communicates with the atmosphere and the exhaust passage, and a three-way catalytic converter. The method comprises creating a fuel/air charge that is richer than stoichiometric in the charge forming means, combusting the charge in the combustion chamber, discharging the combusted charge into the exhaust passage, adding to the combusted charge the amount of air needed to create a substantially stoichiometric charge in the exhaust passage immediately upstream of the catalyst by pumping a preselected amount of air from the air pump into the exhaust passage, and passing the combusted charge and the added air through the three-way catalyst.

The present invention discloses a new and unique method of utilizing a three-way catalyst. Per this invention, the charge forming means creates and the engine combustion chambers are supplied with a richer than stoichiometric mixture from a conventional carburetor or an injection system. Extra air is then added to the exhaust system at or upstream of the catalyst or reactor to establish stoichiometry immediately upstream or within the catalyst. The air pump must either be properly sized and operated at the proper speed or the amount of air supplied must be regulated depending on engine air flow and thus engine load, and on the air/fuel ratio the engine is actually using.

The auxiliary air can be supplied by many possible means. However, when an engine is used for boat propulsion, the engine load and air flow are generally directly related to the rotational speed of the engine. For this application an air pump driven directly off of the crankshaft of the engine has an advantage of naturally increasing air flow with the engine speed. Accordingly, a properly sized air pump needs little or no valving or sophisticated controls to provide the proper amount of air to the exhaust passage upstream of the catalyst to create a stoichiometric environment in the catalyst.

It is a principal feature of the invention to provide an engine that can be run slightly rich throughout much of its load range, especially at the Upper end of the load range so as not to burn or damage exhaust valves. Pollution generated by running rich can be eliminated by properly sizing or regulating the output of an air pump and pumping additional air into the exhaust stream immediately upstream of a catalyst so that a stoichiometric, or close to stoichiometric, mixture is provided in the exhaust stream at 0r immediately upstream of the catalyst.

It is another independent feature of the invention that this can be provided by the proper sizing and gearing of the air pump so that sophisticated electronic controls are not necessary. This will allow a catalyst to run as a three-way catalyst.

By following this invention, an engine can be run slightly rich in order to protect is internal components, especially exhaust valves, and yet the emissions can be greatly reduced because the catalyst will operate as a three-way catalyst.

Other features and advantages of the invention will become apparent to those skilled in the art upon review of the following detailed description, claims and drawings.

THE DRAWINGS

Figure 1:
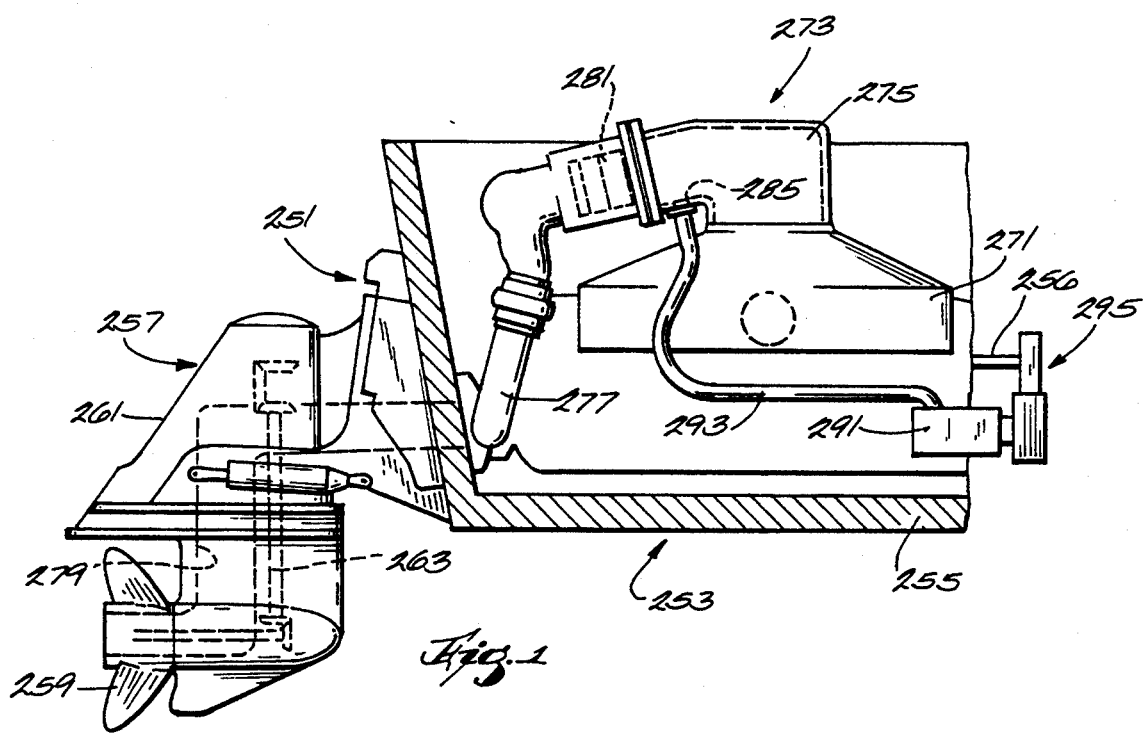
FIG. 1 is a partially sectioned, partially schematic, elevational view of a stern drive unit including various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

The invention provides a marine propulsion device comprising an internal combustion engine 253. The engine 253 includes a charge forming means that may be a conventional carbureted fuel feed means 254 (see FIG. 3) or a fuel injection means which provides a "rich" air/fuel mixture. A rich air/fuel mixture is defined as having a higher proportion of fuel than a stoichiometric mixture, which as seen in FIG. 2, is approximately 14.6 to 1.

Located in the exhaust gas passageway 273 is a so called three-way catalytic converter 281 through which the exhaust gas flows. Such catalytic converters are known and serve to decrease the principal pollutants in the exhaust gas. At the present time, the three pollutants of principal concern emitted from a spark ignited internal combustion engine are unburned hydrocarbons (HC), carbon monoxide (CO), and oxides of nitrogen (NOx). The amount of HC and CO emitted can be decreased by oxidizing these constituents to form water and carbon dioxide. The amount of NOx can be decreased by decomposition in a reducing atmosphere to N and O. With a proper blend of catalytic compounds and proper mixture of incoming gasses, it is possible to operate a three-way catalyst; one which will oxidize the CO and HC and which will simultaneously, or at least within the same enclosure, reduce the NOx.

As noted earlier, three-way catalysts are common in the automotive art. Presently, catalysts use either a ceramic or metallic substrate. Metallic substrate catalysts are currently being made by Kemira of Finland or Emitec and Behr of Germany. These suppliers create metallic substrate catalysts that have a reputation for greater durability in conditions with high vibration and gas flow. The application to a marine engine and the consequent potential for sustained wide open throttle operation constitutes a possible severe environment for a catalyst and metallic substrate catalysts are preferred, although, ceramic substrate catalysts, made by domestic manufacturers may also work in the invention.

Figure 2:
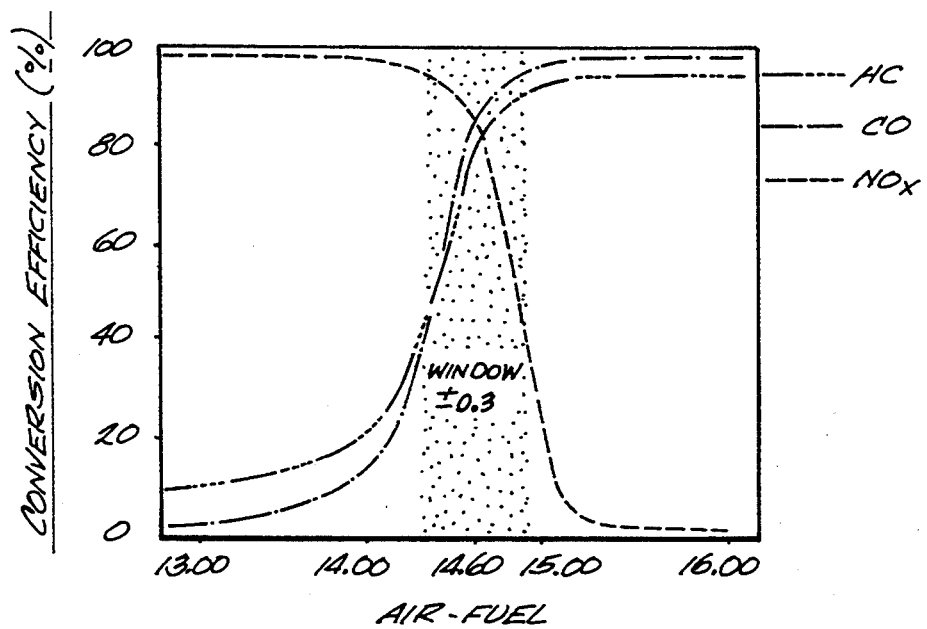
FIG. 2 is a graph of conversion efficiencies of selected pollutants with air/fuel ratio.

As shown in FIG. 2, the conversion efficiencies for the three primary pollutants are optimized when the air/fuel mixture is substantially close to stoichiometric, or 14.6 to 1. The invention provides that the ratio should preferably be held to plus or minus 0.3 as shown in the figure in order to obtain proper operation of the catalyst as a three-way catalyst.

Downstream of the exhaust ports, the exhaust gas passageway 273 includes a secondary air inlet port 285 adapted for introducing secondary air into the catalytic converter 281 or into the exhaust gas passageway 67 upstream of the catalytic converter 281 so as to enable substantial elimination from the exhaust gas of pollutants The marine propulsion device also includes means for pumping air from the atmosphere into the secondary air inlet 285 in the exhaust gas passageway 273 to facilitate elimination of the undesirable pollutants.

Figure 3:
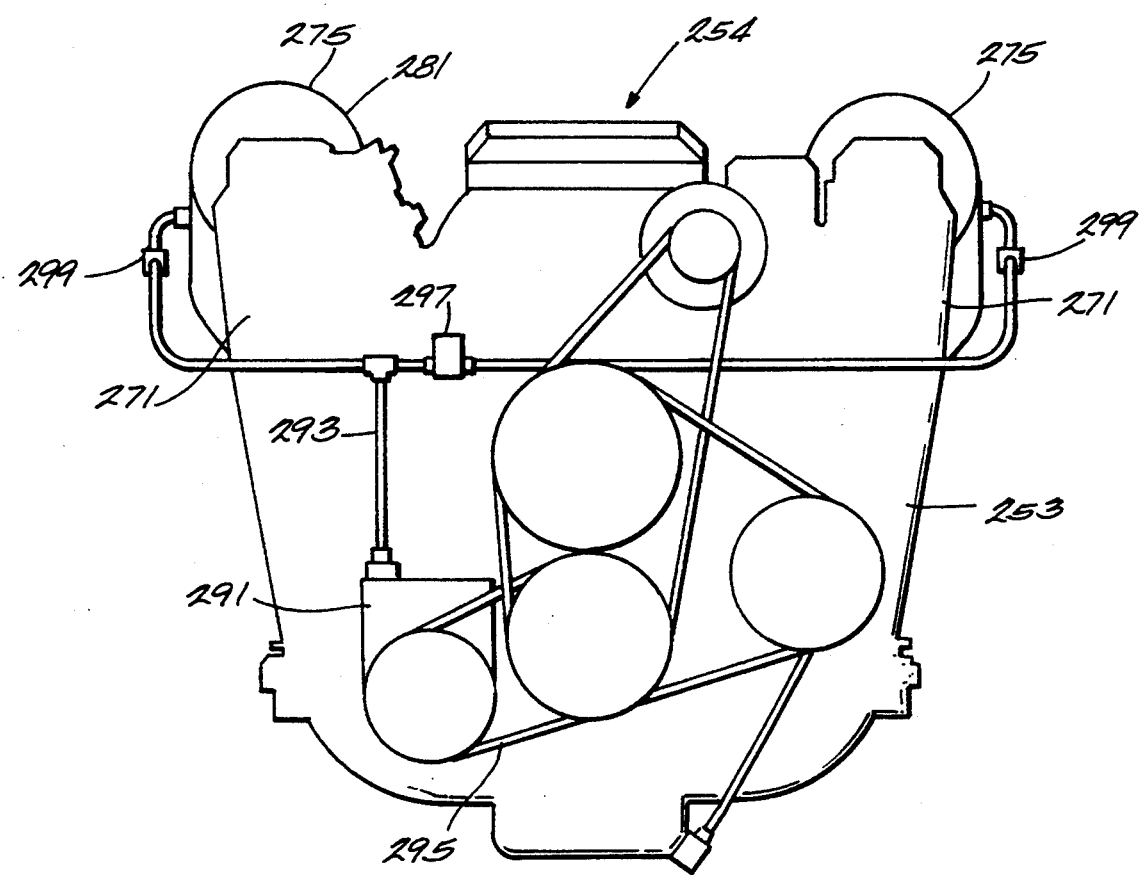
FIG. 3 is a partial schematic front view of a stern drive engine incorporating various features of the invention.

Shown in FIGS. 1 and 3 are preferred embodiments of the invention wherein the marine propulsion device is in the form of a stern drive unit 251 including an internal combustion engine 253 stationarily mounted Within a boat 255 and including a crankshaft 256. The stern drive unit 251 also includes a drive unit 257 which includes a propeller 259 and which is tiltable and steerable relative to the engine 253 and to the boat 255.

The drive unit 257 includes a drive shaft housing 261 including a drive shaft 263 which is driven by the engine crankshaft 256 and which is drivingly connected to the propeller 259 for propelling the boat.

The engine 253 includes a plurality of cylinders (not shown) each having an exhaust port (not shown) communicating with an exhaust manifold 271 which forms a part of an exhaust passageway 273 which communicates through an exhaust elbow 275 with an exhaust pipe which, in turn, communicates with an exhaust passage 279 located in the drive Shaft housing 261 and arranged to discharge exhaust gas through a hollow hub incorporated in the propeller 259. Included an the exhaust passageway 273, either in the exhaust pipe 277 or in the exhaust elbow 275, is a three-way catalytic converter 281 as described hereinbefore.

Means are provided for supplying the catalytic converter 281 with air to facilitate elimination of the pollutants in the exhaust gas. In a preferred embodiment, such means supplies air at all times during engine operation and with amounts which increase with increasing engine speed.

While other arrangements can be employed, in the disclosed construction, such means Comprises a suitable air pump 291 which includes an inlet communicating with the atmosphere and an outlet communicating through a duct 293 with an inlet port 285 in the exhaust passageway 275 upstream of the catalytic converter 281. The air pump 291 is driven from the engine, either by the drive shaft 263, or by the engine crankshaft 256, or by a stub shaft (not shown). In the disclosed construction the air pump 291 is driven by the engine crankshaft 256 through a belt and pulley arrangement at a speed which is directly proportional to engine speed. Thus, the construction shown in FIGS. 1, 3 and 9 employs a conventional a pump 291, such as that produced by the Saginaw Division of General 1 Motors Corporation, which is mounted on the engine 253 and which is driven from the crankshaft by a belt and pulley arrangement 295.

The embodiment shown in FIG. 1 utilizes no valves between the air pump 291 and the Secondary air inlet port 285. The air pump is sized and the pulley is sized such that as the engine speed increases, and thus the amount of air needed by the engines increases, the output of he air pump increases equally to provide a substantially stoichiometric fuel/air mixture at or immediately upstream of the catalyst 281.

In one embodiment the air duct may also incorporate a pressure relief valve 297 and orifices in the inlet ports 285 to regulate air flow. As shown in FIG. 3, the air pump in this embodiment discharges into the air duct 293 which has a tee to direct the air to the catalysts, one for each bank of cylinders. An optional check valve 299 may also be included in the air duct so that air is only allowed to flow into the catalytic converter 281. The air pump and pulleys are sized such that the output of the air pump increases directly with the speed of the engine. However, in this embodiment the needs of the engine decrease with speed such that at higher speeds the output of the air pump exceeds the needs of the engine. Since the pressure in the air duct 293 increases with engine speed, the additional air pumped by the air pump is simply bled off to the atmosphere through the pressure relief valve so that the proper amount of air, enters the exhaust passage immediately upstream of the catalyst and a stoichiometric mixture, or substantially stoichiometric mixture, enters the catalyst and the catalyst can operate as a three-way catalyst. This system obviously requires no sophisticated electronic valves or oxygen sensors to maintain a substantially stoichiometric condition.

In another embodiment, not shown, the needs of the engine are not linear, but vary depending on engine speed. In that case, a diverter valve is needed in the air line and a controller for the diverter valve connected to the engine management system controls the amount of air to be bled out of the air duct so that the amount of air entering the exhaust passage is equal to the amount needed by the engine and a stoichiometric mixture is created at or immediately upstream of the catalyst. As a further alternative, the engine management system could control the air pump directly to control the amount of air added to the exhaust passage upstream of the catalyst.

In the preceding discussion, a stoichiometric mixture is described as being needed at or immediately upstream of the catalyst. This is similar or possibly the same as a stoichiometric mixture in the charge forming means. In other words, the amount of air needed to create a stoichiometric mixture in the charge forming means should be substantially the same amount of air that needs to be added to the exhaust if the air/fuel ratio is rich in the combustion chamber.

The engine disclosed herein can be run with a "rich" air/fuel ratio to provide higher power, better running quality and response, and reduced thermal stress, particularly on the engine valves, and still provide relatively pollution free emissions at all engine speeds. Furthermore, air is supplied to the catalytic converter at all times, and the amount of air supplied to the catalytic converter increases with increasing engine speed. Moreover, this can be accomplished in most engines without the need of sophisticated electronic controls or valves.

Although the marine propulsion device shown in the drawings and described in the specification is a stern drive unit, it can be appreciated that the invention will work equally well with an outboard motor mounted substantially outside of the boat, especially if the outboard had a four cycle powerhead.

Various of the features of the invention are set forth in the following claims:

I claim:

1. A marine propulsion device comprising an engine which includes a cylinder having an exhaust port and which is supplied a fuel rich air/fuel mixture, an exhaust passageway communicating with said exhaust port, a three-way catalytic converter located in said exhaust passageway, and an air pump which is driven by said engine at all times when said engine is operating, which includes an inlet communicating with the atmosphere and an outlet communicating with said catalytic converter, and which operates to supply air to said exhaust passageway at or immediately upstream of said catalytic converter so that said catalytic converter receives an air/fuel mixture that is at or about stoichiometry.

2. A marine propulsion device in accordance with claim 1 wherein said marine propulsion device is a stern drive unit.

3. A marine propulsion device in accordance with claim 2 wherein said air pump is driven at a pumping rate determined by engine speed.

4. A marine propulsion device in accordance with claim 1 wherein said marine propulsion device is an outboard motor.

5. A marine propulsion device in accordance with claim 4 wherein said air pump is driven at a pumping rate determined by engine speed.

6. A marine propulsion device in accordance with claim 5 wherein all of the air pumped by the air pump is supplied to the exhaust passageway at or immediately upstream of said catalytic converter.

7. A marine propulsion device in accordance with claim 5 wherein the engine operates over a range of speeds and the amount of air pumped by the air pump is greater than the amount of air supplied to the exhaust passageway at or immediately upstream of said catalytic converter during a portion of said range of speeds.

8. A marine propulsion device comprising an engine which includes a combustion chamber having an exhaust port and which is supplied a fuel-rich air/fuel mixture, an exhaust passage communicating with the exhaust port, a charge forming device, the charge forming device providing the combustion chamber with an air/fuel mixture that is richer than stoichiometric, a three-way catalytic converter located in said exhaust passage, and an air pump including an inlet communicating with the atmosphere, and an outlet communicating with said exhaust passage, said air pump being sized and operated to provide air to said exhaust passage immediately upstream of said catalytic convertor so that said catalytic converter receives an, air/fuel mixture that is at or about stoichiometry.

9. The marine propulsion device of claim 8 wherein said air/fuel ratio is 14.6 to 1 plus or minus 0.3.

10. The marine propulsion device of claim 9 wherein said catalytic converter is of the three-way type.

11. The marine propulsion device of claim 10 wherein the air pump is driven at a rate determined by engine speed.

12. The marine propulsion device of claim 11 wherein said marine propulsion device is an outboard motor.

* * * * *